A. W. AYLING & P. F. REICHERT.
FLOAT.
APPLICATION FILED SEPT. 30, 1909.

952,496.

Patented Mar. 22, 1910.

WITNESSES:
D. C. Walter
Leona Kiburtz

INVENTORS:
Arthur W. Ayling
Paul F. Reichert
By Anson Hall, Atty.

UNITED STATES PATENT OFFICE.

ARTHUR W. AYLING AND PAUL F. REICHERT, OF TOLEDO, OHIO.

FLOAT.

952,496.

Specification of Letters Patent.

Patented Mar. 22, 1910.

Application filed September 30, 1909. Serial No. 520,336.

*To all whom it may concern:*

Be it known that we, ARTHUR W. AYLING and PAUL F. REICHERT, citizens of the United States, residing at Toledo, in the county of Lucas and State of Ohio, have invented certain new and useful Improvements in Floats; and we do declare the following to be a full, clear, and exact description of the invention, such as will enable others skilled in the art to which it appertains to make and use the same, reference being had to the accompanying drawings, and to the figures of reference marked thereon, which form a part of this specification.

In the construction and use of floats for controlling valves it frequently happens that the float leaks and becomes useless from becoming filled with water. This is due to imperfect soldering or to the solder being eaten away by impure water.

Our invention is designed to overcome the difficulties here indicated and to furnish a float which is hermetically sealed and which employs no solder in the formation of the joints. We attain these objects by means of the devices, construction and arrangement of parts hereinafter described, and shown and illustrated in the accompanying drawings, in which—

Figure 1:
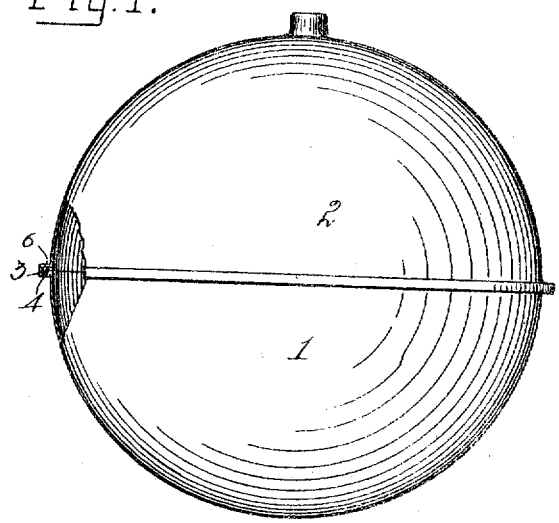
Figure 2:
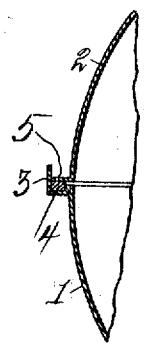

Figure 1 illustrates our float with the parts assembled and with a portion broken away to show the joint, hereinafter referred to, in transverse section; Fig. 2 a transverse sectional elevation of the joint, hereinafter referred to, in course of construction and on an enlarged scale, and Fig. 3 the same, showing the joint completed.

Like numerals of reference indicate like parts throughout the drawings.

Figure 3:

In the drawings, 1 and 2 are equal semispherical sheet metal shells composed of brass, aluminum, copper or other suitable metal. If desired, the shell-parts may be so formed as to present oval or cylindrical surfaces instead of spherical surfaces. At the margin of the shell-part 1 is an outwardly projecting flange 3 having formed therein a channel in which is disposed a gasket 4 composed of rubber or other suitable material. Upon the margin of the shell-part 2 is formed a flat outwardly projecting flange 5 which rests upon the gasket 4. The margin of the flange 3 projects upwardly far enough to permit its being turned backwardly or inwardly so that it will overlap the flange 5, as at 6 (Fig. 3). When the two shell-parts are brought together with the flange 5 resting upon the gasket 4, the projecting margin of the flange 3 is turned inwardly and powerfully compressed upon the flange 5, thus compressing the gasket within its channel and securing the two shell-parts immovably together. The turning of the flange 3 is accomplished between dies, the construction of which will be well understood by those skilled in the art without further explanation. The joint thus formed is air-tight and water-tight, and in practice has been found to be practically as indestructible as the metal of which the float is composed.

Having described our invention, what we claim and desire to secure by Letters Patent is,—

A float for valves comprising two shellparts having corresponding meeting margins, one of the margins having a channeled outwardly projecting flange, a gasket within such channel, the other shell-part having an outwardly projecting flat flange resting upon said gasket, the margin of the first mentioned flange being turned inwardly and tightly compressed upon the other flange.

In testimony whereof we affix our signatures in presence of two witnesses.

ARTHUR W. AYLING.
PAUL F. REICHERT.

Witnesses:
CLAYTON MURPHY,
LEONA KIBURTZ.